United States Patent [19]
Li et al.

[11] 3,926,926
[45] Dec. 16, 1975

[54] THERMOPLASTIC ACRYLONITRILE COPOLYMERS

[75] Inventors: George S. Li, Aurora; Gerald P. Coffey, Cleveland Heights, both of Ohio

[73] Assignee: The Standard Oil Company, Cleveland, Ohio

[22] Filed: Nov. 20, 1974

[21] Appl. No.: 525,376

[52] U.S. Cl............ 260/85.5 B; 260/80.72; 260/81; 260/85.5 HC; 260/85.5 F
[51] Int. Cl.²..................................... C08F 244/00
[58] Field of Search.......... 260/81.0, 80.72, 85.5 B, 260/85.5 HC, 85.5 F

[56] References Cited
OTHER PUBLICATIONS
J. Polymer Science, Vol. 1, No. 6, K. Nozaki, 455(1946), Applicant has this reference, "Preparative Methods of Polymer Chemistry," W. R. Sorenson & T. W. Campbell, Intersci. Publ., Inc., N.Y., 1961.

Primary Examiner—Joseph L. Schofer
Assistant Examiner—F. R. Cervi
Attorney, Agent, or Firm—John F. Jones; Sherman J. Kemmer

[57] ABSTRACT

Polymeric compositions having high heat-distortion temperatures which function as gas and vapor barrier materials which are composed of an olefinically unsaturated nitrile, such as acrylonitrile, and indene are described.

3 Claims, No Drawings

THERMOPLASTIC ACRYLONITRILE COPOLYMERS

The present invention relates to novel polymeric compositions which have low permeability to gases and vapors, and more particularly pertains to polymeric compositions having high heat-distortion temperatures which function as gas and vapor barrier materials and are composed of an olefinically unsaturated nitrile and indene or coumarone or mixtures of indene and coumarone, and to a novel process for preparing same.

Copolymers of acrylonitrile and indene have been made from equimolar amounts of acrylonitrile and indene in a sealed tube reactor using benzoyl peroxide catalyst to give a low conversion of monomers to polymer (21.5%). These polymeric products containing 35.4% by weight of acrylonitrile have been described by Nozaki in J. Polymer Sci., 1, 455 (1946). Another publication (L. J. Young, J. Poly. Sci., 54, 411 (1961)) lists the reactivity ratios for many monomer pairs including acrylonitrile-indene. The data obtained on reactivity ratios of acrylonitrile and indene described by Young are based on the unpublished work of G. G. Lowry and W. K. Carrington. These prior art acrylonitrile-indene copolymers are relatively low-molecular weight, low-acrylonitrile polymers which can be readily distinguished from the polymers of the present invention on the basis of the unobvious and unexpectedly superior physical and chemical properties possessed by the latter.

The novel polymeric products of the present invention are prepared by polymerizing a major proportion by weight of an olefinically unsaturated nitrile, such as acrylonitrile, and a minor proportion by weight of indene or coumarone or mixtures of indene and coumarone.

The olefinically unsaturated nitriles useful in the present invention are the alpha,beta-olefinically unsaturated mononitriles having the structure

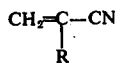

wherein R is hydrogen, a lower alkyl group having from 1 to 4 carbon atoms, or a halogen. Such compounds include acrylonitrile, alpha-chloroacrylonitrile, alpha-fluoro-acrylonitrile, methacrylonitrile, ethacrylonitrile, and the like. The most preferred olefinically unsaturated nitrile in the present invention is acrylonitrile.

Indene (1-H-indene) and coumarone (also known as benzofuran) and mixtures thereof are employed in minor proportions in the novel copolymers of this invention. Indene, for instance, is an inexpensive, commercially available monomer which is a by-product of coke operations, such as in steel mills, and can also be obtained from petroleum in a refinery by the steam cracking of naphtha.

The polymeric compositions of the present invention can be prepared by any of the known general techniques of polymerization including the bulk polymerization, solution polymerization, and emulsion or suspension polymerization techniques by batch, continuous or intermittent addition of the monomers and other components. The preferred method is an aqueous emulsion polymerization to produce a latex of the resinous copolymer.

The polymerization process of this invention is preferably carried out in aqueous medium in the presence of an emulsifier and a free-radical generating polymerization initiator at a temperature in the range of from about 0° to 100°C in the substantial absence of molecular oxygen. It is also preferred to use a molecular-weight modifier such as a mercaptan in the polymerization reaction to control the molecular weight of the polymer to within desired limits.

The preferred polymeric compositions embodied herein are those resulting from the polymerization of (A) at least 50% by weight of an olefinic nitrile having the structure

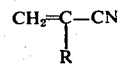

wherein R has the foregoing designation and (B) up to 50% by weight based on the combined weight of (A) and (B) of at least one member selected from the group consisting of indene and coumarone.

More specifically, this invention can be illustrated in the polymerization of a mixture of a major proportion of acrylonitrile and a minor proportion of indene to produce a product having high ASTM (D-648) heat-distortion temperatures, on the order of 100°C and above, and excellent impermeability to gases and vapors when exposed to the gases and vapors in the form of a film, sheet, bottle, or other type of container.

Preferably, the acrylonitrile-indene monomer used in the polymerization reaction should contain from 50 to 90% by weight of acrylonitrile based on the combined weight of acrylonitrile and indene, and more preferably from about 60 to 90% by weight of acrylonitrile and correspondingly from about 10 to 40% by weight of indene should be used in the polymerization reaction.

The novel polymeric products of this invention are easily processable, thermoplastic resinous materials which can be readily thermoformed into a wide variety of useful articles in any of the conventional ways employed with known thermoplastic polymeric materials such as by extrusion, milling, molding, drawing, blowing, etc., all well known to those of ordinary skill in the art. The novel polymeric products of this invention have excellent solvent resistance and their extremely low permeability to gases and vapors such as oxygen (oxygen transmission by ASTM D–1434–66 of about 0.1 to 2), carbon dioxide and water vapor (water vapor transmission by ASTM E–96–66 of about 1.5 to 5), makes them particularly useful in the manufacture of bottles, film, sheet, and other forms for containers for liquids, gases, and solids.

In the following illustrative examples, the amounts of ingredients are expressed in parts by weight unless otherwise indicated.

EXAMPLE 1

An acrylonitrile-indene copolymer was prepared by adding the following ingredients to a polymerization reactor:

| Ingredient | Parts |
| --- | --- |
| Water | 360 |
| GAFAC RE-610* (emulsifier) | 3 |
| acrylonitrile | 70 |
| indene (distilled) | 30 |

-continued

| Ingredient | Parts |
|---|---|
| n-dodecyl mercaptan | 0.2 |

*A mixture of $R-O-(CH_2CH_2O-)_nPO_3M_2$ and $[R-O-(CH_2CH_2O-)_n]_2PO_2M$ wherein n is a number from 1 to 40, R is an alkyl or aralkyl group and preferably a nonyl phenyl group, and M is hydrogen, ammonia or an alkali metal, which composition is sold by GAF Corporation.

The above mixture was stirred continuously and heated to 70°C in a nitrogen atmosphere from which essentially all molecular oxygen had been excluded and at which time there was added 0.3 part of potassium persulfate. The polymerization reaction was carried out at 70°C with stirring for 16 hours. The resulting latex was treated with hot (95° to 100°C) aqueous $Al_2(SO_4)_3.18H_2O$ in which there were used 3 parts per hundred of monomer based on the above recipe of $Al_2(SO_4)_3.18H_2O$. The coagulated resin was separated by filtration and was washed with hot water and methanol. The vacuum-dried resin was obtained in 86% yield. This resin was found to have the following properties:

| | |
|---|---|
| Brabender plasticorder torque (230°C, 35 rpm, 50 grams) | 1900 meter grams |
| acrylonitrile in the resin by elemental nitrogen analysis | 67.5% |
| molecular weight, by GLPC method | $1.37 \times 10^5$ |
| ASTM D-648 heat-distortion temperature | 114°C (264 psi) |

EXAMPLE 2

A copolymer was prepared by the procedure described in Example 1 from the following ingredients:

| Ingredient | Parts |
|---|---|
| water | 300 |
| GAFAC RE-610 | 3 |
| acrylonitrile | 80 |
| indene | 20 |
| n-dodecyl mercaptan | 0.1 |

The polymerizaton was carried out at 70°C with 0.3 part of potassium persulfate initiator. The polymerization was carried out for 5 hours. The resulting resin (58% yield) was isolated as described in Example 1 and was found to have the following properties:

| | |
|---|---|
| acrylonitrile by nitrogen analysis | 69.5% |
| molecular weight, by GLPC method | $2.0 \times 10^5$ |
| ASTM heat-distortion temperature | 106°C (264 psi) |
| oxygen transmission (ASTM D-1434-66) | 0.322 cc mil/100 inches$^2$/24 hours |
| water vapor transmission (ASTM E-96-66) | 2.28 grams mil/100 inches$^2$/24 hours/atmosphere |

EXAMPLE 3

An acrylonitrile-indene copolymer was prepared according to the procedure of Example 1 using 60 parts of acrylonitrile and 40 parts of indene in the polymerization recipe. The resulting resin was obtained in 85% yield and was found to contain 52.3% by weight of acrylonitrile. The resin was found to have the following properties:

| | |
|---|---|
| molecular weight | $0.9 \times 10^5$ |
| ASTM heat-distortion temperature | 116°C |
| Brabender plasticorder torque | 820 meter grams |

EXAMPLE 4

A copolymer of acrylonitrile and indene was prepared according to the procedure of Example 1 except that 75 parts of acrylonitrile and 25 parts of indene were employed. The resulting resin was obtained in 88% yield and was found to contain 72.5% by weight of acrylonitrile. The resin had the following properties:

| | |
|---|---|
| molecular weight | $1.3 \times 10^5$ |
| ASTM heat-distortion temperature | 111°C |
| Brabender plasticorder torque | 2400 meter grams |

EXAMPLE 5

A copolymer was prepared by the procedure of Example 2. The resin was obtained in 73% conversion and was found to contain 76.3% by weight of acrylonitrile. This resin had the following properties:

| | |
|---|---|
| molecular weight | $1.0 \times 10^5$ |
| ASTM heat-distortion temperature | 105°C |
| Brabender plasticorder torque | 2520 meter grams |

EXAMPLES 6–11

A series of polymers were prepared according to Example 1 employing various ratios of acrylonitrile-indene monomers in the polymerization reaction. The resulting resins were analyzed for acrylonitrile content, oxygen transmission (OTR) and water vapor transmission (WVTR). The results are given in Table 1.

Table 1

| Example | Composition by Weight % Acrylonitrile-Indene | WVTR | OTR |
|---|---|---|---|
| 6 | 55.6 – 44.4 | 4.09 | 2.08 |
| 7 | 69.5 – 30.5 | 2.28 | 0.3 |
| 8 | 73.5 – 26.5 | 1.74 | 0.17 |
| 9 | 74 – 26 | 1.79 | 0.23 |
| 10 | 76 – 24 | 1.68 | 0.32 |
| 11 | 80 – 20 | | 0.18 |

EXAMPLE 12

An acrylonitrile-indene polymer outside the scope of the present invention was prepared according to the published procedure of Nozaki, J. Polymer Sci., 1, 455 (1946) from the following ingredients:

| Ingredient | Parts |
|---|---|
| acrylonitrile | 31.5 |
| indene (distilled) | 68.5 |
| benzoyl peroxide | 0.10g |

These ingredients were used in the same weight ratio as that disclosed by Nozaki. These ingredients were placed in a pyrex ampule, cooled to −70°C in a dry ice-acetone bath, sealed after two evacuations with an oil-pump vacuum line, and then heated to 70° to 80°C for 30 hours. The resulting polymer was purified by two precipitations from methanol (redissolution was achieved in acetone) and dried to constant weight. The polymer yields in several such runs varied from 18 to 21% by weight. The resin could not be compression molded into a test bar because it always shattered into many pieces when attempts were made to remove it from the mold. Because of its extreme brittleness, this polymer could not be further evaluated. Carbon-hydrogen-nitrogen analysis of the polymer indicated that it contained 39.6% by weight of acrylonitrile. Molecular weight determination by GLPC indicated it had a molecular weight of $4.3 \sim 4.8 \times 10^4$.

EXAMPLE 13

A copolymer of acrylonitrile and indene, which is outside the scope of this invention, was prepared using the ratio of acrylonitrile-indene disclosed in the Nozaki publication mentioned in Example 12 by an aqueous emulsion technique in an attempt to obtain a control resin to compare with the resins of the present invention. The following ingredients were used:

| Ingredient | Parts |
|---|---|
| water | 250 |
| GAFAC RE-610 (emulsifier) | 2.5 |
| acrylonitrile | 31.5 |
| indene (distilled) | 68.5 |
| n-dodecyl mercaptan | 0.05 |

This mixture was stirred continuously and heated to 70°C under a nitrogen atmosphere from which essentially all of the molecular oxygen had been excluded. When the temperature reached 70°C, there was added 0.1 part of potassium persulfate. The polymerization reaction was carried out at 70°C for 30 hours with three additional boostings with 0.1 part of potassium persulfate at 3.5, 8, and 25 hours from the start. The resulting latex was diluted with methanol and the precipitated polymer was collected and dried under vacuum. A yield of 37% by weight of dry polymer was obtained. Carbon-hydrogen-nitrogen analysis of this polymer indicated it contained 37% by weight of acrylonitrile. Molecular weight determination by GLPC indicated it had a molecular weight of $6.2 \times 10^4$. The resin could be compression molded into bars at 6000 psi and 140°C. The bars were so brittle that the ASTM heat-distortion temperature could not be measured, and satisfactory films for gas-barrier measurements could not be made on repeated attempts.

EXAMPLE 14

An acrylonitrile-coumarone copolymer was prepared by adding the following ingredients to a polymerization reactor:

| Ingredient | Parts |
|---|---|
| water | 300 |
| GAFAC RE-610 (emulsifier) | 3 |
| acrylonitrile | 70 |
| coumarone | 30 |
| n-dodecyl mercaptan | 0.1 |

The above mixture was stirred continuously and heated to 55°C in a nitrogen atmosphere from which essentially all molecular oxygen had been excluded and at which time there was added 0.2 part of potassium persulfate. The polymerization reaction was carried out at 55°C with stirring for 16 hours. The resulting latex was treated with hot (95° to 100°C) aqueous $Al_2(SO_4)_3 \cdot 18H_2O$ in which there were used 3 parts per hundred of monomer based on the above recipe of $Al_2(SO_4)_3 \cdot 18H_2O$. The coagulated resin was separated by filtration and was washed with hot water and methanol. The vacuum-dried resin was obtained in 58% yield and was found to contain 86% by weight of acrylonitrile. The resin had the following properties:

| | |
|---|---|
| molecular weight | $4.4 \times 10^5$ |
| ASTM heat-distortion temperature | 98°C |

EXAMPLE 15

A copolymer of acrylonitrile and coumarone was prepared according to the procedure of Example 14 except that 75 parts of acrylonitrile and 25 parts of coumarone were employed. The resulting resin was obtained in 63% yield and was found to contain 88% by weight of acrylonitrile. The resin had the following properties:

| | |
|---|---|
| molecular weight | $4.3 \times 10^5$ |
| ASTM heat-distortion temperature | 99°C |

EXAMPLE 16

A copolymer of acrylonitrile and coumarone was prepared according to the procedure of Example 14 except that 80 parts of acrylonitrile and 20 parts of coumarone, and 0.3 part of potassium persulfate were employed and stirring time was 13 hours. The resulting resin was obtained in 84% yield and was found to contain 94% by weight of acrylonitrile. The resin had the following properties:

| | |
|---|---|
| molecular weight | $4.6 \times 10^5$ |
| ASTM heat-distortion temperature | 97°C |

We claim:
1. The composition resulting from the copolymerization of (A) from 50 to 90% by weight of acrylonitrile and (B) from 10 to 50% by weight of at least one member selected from the group consisting of indene and coumarone.
2. The composition of claim 1 wherein (B) is indene.
3. The composition of claim 1 wherein (A) is present in from about 60 to 90% by weight and (B) is present in from about 10 to 40% by weight.

* * * * *